(12) United States Patent
Brown

(10) Patent No.: US 6,480,315 B1
(45) Date of Patent: Nov. 12, 2002

(54) METHOD AND APPARATUS FOR SNR MEASUREMENT

(75) Inventor: Matthew Brown, Kanata (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/369,370

(22) Filed: Aug. 6, 1999

(51) Int. Cl.[7] .............................................. H04B 10/06
(52) U.S. Cl. ....................... 359/189; 359/177; 375/227
(58) Field of Search ............................... 359/189, 194, 359/174, 176, 177, 110; 370/241, 246; 375/224, 227, 228

(56) References Cited

U.S. PATENT DOCUMENTS

| 5,282,074 A | * | 1/1994 | Miyazaki et al. ........ 359/177 X |
| 5,594,946 A | | 1/1997 | Menich et al. .............. 455/522 |
| 5,796,479 A | | 8/1998 | Derickson et al. ........... 356/326 |
| 5,802,446 A | * | 9/1998 | Giorgi et al. ............ 375/227 X |
| 5,887,031 A | * | 3/1999 | Parr et al. ..................... 375/227 |
| 5,920,414 A | * | 7/1999 | Miyachi et al. ......... 359/177 X |
| 6,016,213 A | * | 1/2000 | Farber et al. ................ 359/177 |

FOREIGN PATENT DOCUMENTS

JP 331081 * 11/1999

* cited by examiner

Primary Examiner—Thomas Mullen

(57) ABSTRACT

A method and apparatus for monitoring the signal to noise ratio (SNR) of a noisy data signal in an optical communication system. In a receiver, input of a noisy data signal to a limiting amplifier results in a regenerated data signal. The regenerated data signal is compared to the noisy data signal and the difference signal is assumed to be, for the most part, noise. A measure of the amplitude of the regenerated data signal is divided by a measure of the energy of the difference signal to result in an indication of the SNR of the noisy data signal.

43 Claims, 7 Drawing Sheets

METHOD AND APPARATUS FOR SNR MEASUREMENT

FIELD OF THE INVENTION

The present invention relates to signal monitoring in digital communication systems and in particular monitoring of a signal to noise ratio (SNR) in such systems.

BACKGROUND OF THE INVENTION

In digital communication systems it is desirable that data is received free from errors. However, errors will arise due to noise inherent to the transmission system. One measure of the amount of noise in a received signal is a "signal to noise ratio" or SNR. In particular, the SNR level referred to herein is the ratio of signal peak amplitude to the standard deviation of the noise. This is one representation of SNR among many. The SNR, thus defined, is usually represented by the letter "Q". For instance, an SNR of 2 indicates that the amplitude of the received data signal is twice the RMS level of the noise. If a received signal is free of noise, the SNR is infinite.

Systems are designed to minimise noise on the transmission medium and to improve the system tolerance to noise. The system tolerance to noise is often quantified as a bit error rate (BER) at a particular SNR. Under certain conditions, such as component failure or electromagnetic interference, the SNR will be reduced such that the BER exceeds acceptable levels. By measuring the SNR on a data stream, it is possible to estimate the bit error rate (BER) caused by the noise and to know when the quality of a connection cannot support a required BER. A capability to monitor the SNR of a transmission system, then, is applicable to performance monitoring, fault detection, fault isolation, system test, system setup and other common telecommunication activities and functions.

In U.S. Pat. No. 5,796,479 issued Aug. 18, 1998 to Derickson et al., SNR is one of three qualities of a received optical signal which are monitored. A spectrometer spatially separates signals from wavelength division multiplexed (WDM) channels according to wavelength. The separated signals are incident on an array of split-detectors that conforms to the spatial separation of the signals provided by the spectrometer. While the split-detectors are positioned to receive a signal from each WDM channel, a noise detector is positioned between adjacent split-detectors to measure noise. A common mode output from two halves of each split-detector indicates the power in a WDM channel. The ratio of the common mode signal to the noise detector signal is used to monitor the SNR of each WDM channel. By virtue of measuring the noise outside the band of the channel of interest, the contribution to the overall noise power of in-band noise sources such as inter-symbol interference (ISI) is not taken into account. As well, noise introduced by such receiver components as a photodetector and preamplifier is not monitored.

SUMMARY OF THE INVENTION

The present invention discloses a method and apparatus for monitoring the signal to noise ratio (SNR) of a recovered data signal in a communication system. A signal representative of the difference between the input and output of a limiting amplifier in a receiver is assumed to be noise. A measure of the amplitude of the output signal is divided by a measure of the energy of the noise signal to result in an indication of the SNR of the input data signal.

In accordance with an aspect of the present invention there is provided a method of determining an indicator of signal to noise ratio in a noisy data signal including receiving the noisy data signal and limiting the noisy data signal to obtain a regenerated data signal. Subsequently, the method includes generating a noise signal by subtracting the regenerated data signal from the noisy data signal and further determining a magnitude of energy of the noise signal and an amplitude of the regenerated data signal. The method concludes by determining the indicator from the amplitude of the regenerated data signal and the magnitude of energy of the noise signal.

In accordance with a further aspect of the present invention there is provided a monitor for determining an indicator of a signal to noise ratio of a noisy data signal, based on input comprising the noisy data signal and a regenerated data signal, the monitor including a difference circuit for determining a noise signal comprising a difference between the noisy data signal and the regenerated data signal, an energy detector for determining a magnitude of energy of a signal output from the difference circuit, an amplitude detector for determining an amplitude of the regenerated data signal and a ratio circuit for determining an indicator from output of the energy detector and output of the amplitude detector.

In accordance with a further aspect of the present invention there is provided a monitor for determining an indicator of a signal to noise ratio of a noisy data signal, based on input comprising the noisy data signal and a regenerated data signal, the monitor including a first conversion means for converting the noisy data signal from analog to digital, a second conversion means for converting the regenerated data signal from analog to digital and a processor operable to receive a digital representation of the noisy data signal from the first conversion means, receive a digital representation of the regenerated data signal from the second conversion means, generate a noise signal by subtracting the digital representation of the regenerated data signal from the digital representation of the noisy data signal, determine a magnitude of energy of the noise signal, determine an .z amplitude of the regenerated data signal and determine the indicator from the amplitude of the regenerated data signal and the magnitude of energy of the noise signal.

In accordance with a further aspect of the present invention there is provided a receiver in an optical transmission system including a photodetector and preamplifier for converting a received optical signal to a noisy data signal, a limiting amplifier for limiting the noisy data signal to obtain a regenerated data signal and a clock and data recovery circuit for obtaining a retimed data signal and a recovered clock signal from the regenerated data signal. The receiver further includes a signal to noise ratio monitoring circuit operable to receive the noisy data signal and the regenerated data signal, generate a noise signal by subtracting the regenerated data signal from the noisy data signal, determine a magnitude of energy of the noise signal and an amplitude of the regenerated data signal and determine an indicator of a signal to noise ratio of the noisy data signal from the amplitude of the regenerated data signal and the magnitude of energy of the noise signal.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In the figures which illustrate an example embodiment of this invention.

DETAILED DESCRIPTION OF THE PREFERRED EMBODIMENTS

Figure 1:
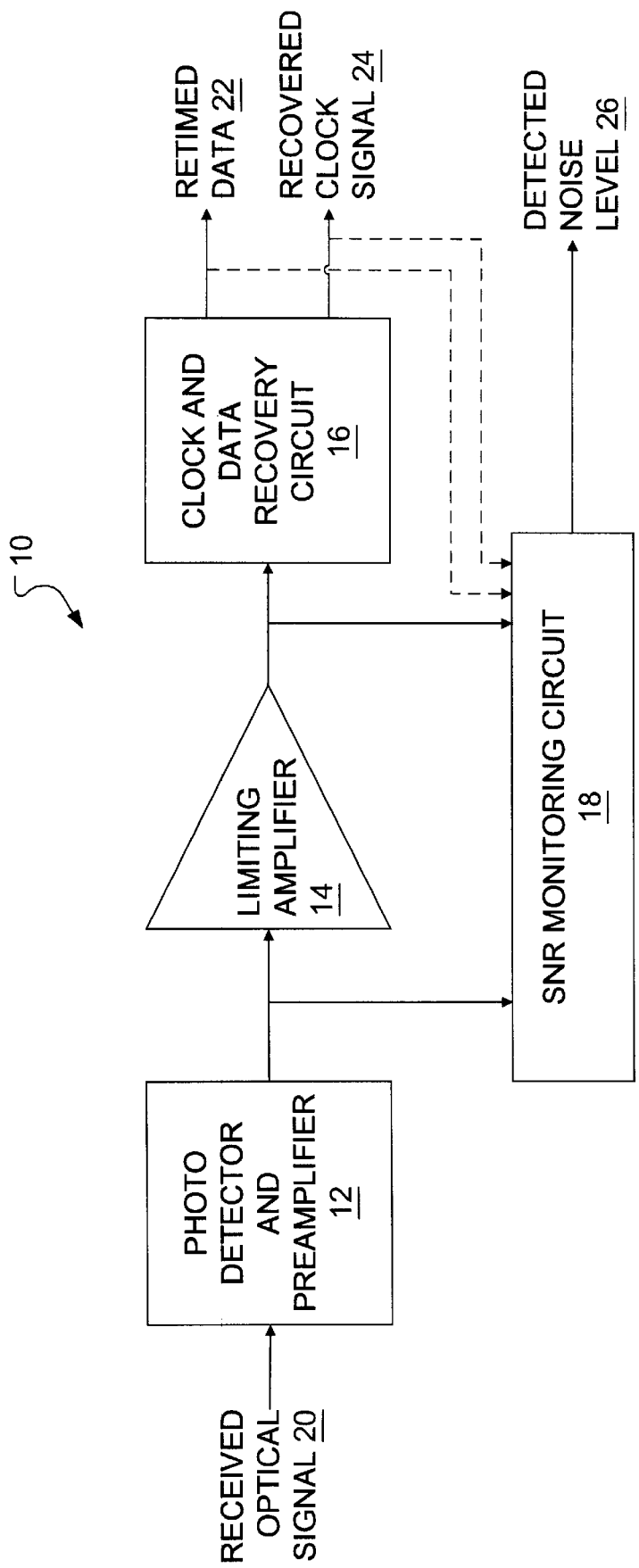
FIG. 1 illustrates, as a block diagram, a typical application of a SNR Monitor Circuit in accordance with an embodiment of present invention.

In FIG. 1 is illustrated a receiver 10 in a optical/digital transmission system including an SNR Monitoring Circuit 18. A received optical signal 20 is received at a photo detector and preamplifier 12 which recovers an electrical data signal and passes it to a limiting amplifier 14 and subsequently to a clock and data recovery circuit 16 from which is output a retimed data signal 22 and a recovered clock signal 24. SNR Monitoring Circuit 18 receives signals at the input and output of limiting amplifier 14 and outputs a detected noise level 26.

Figure 2:
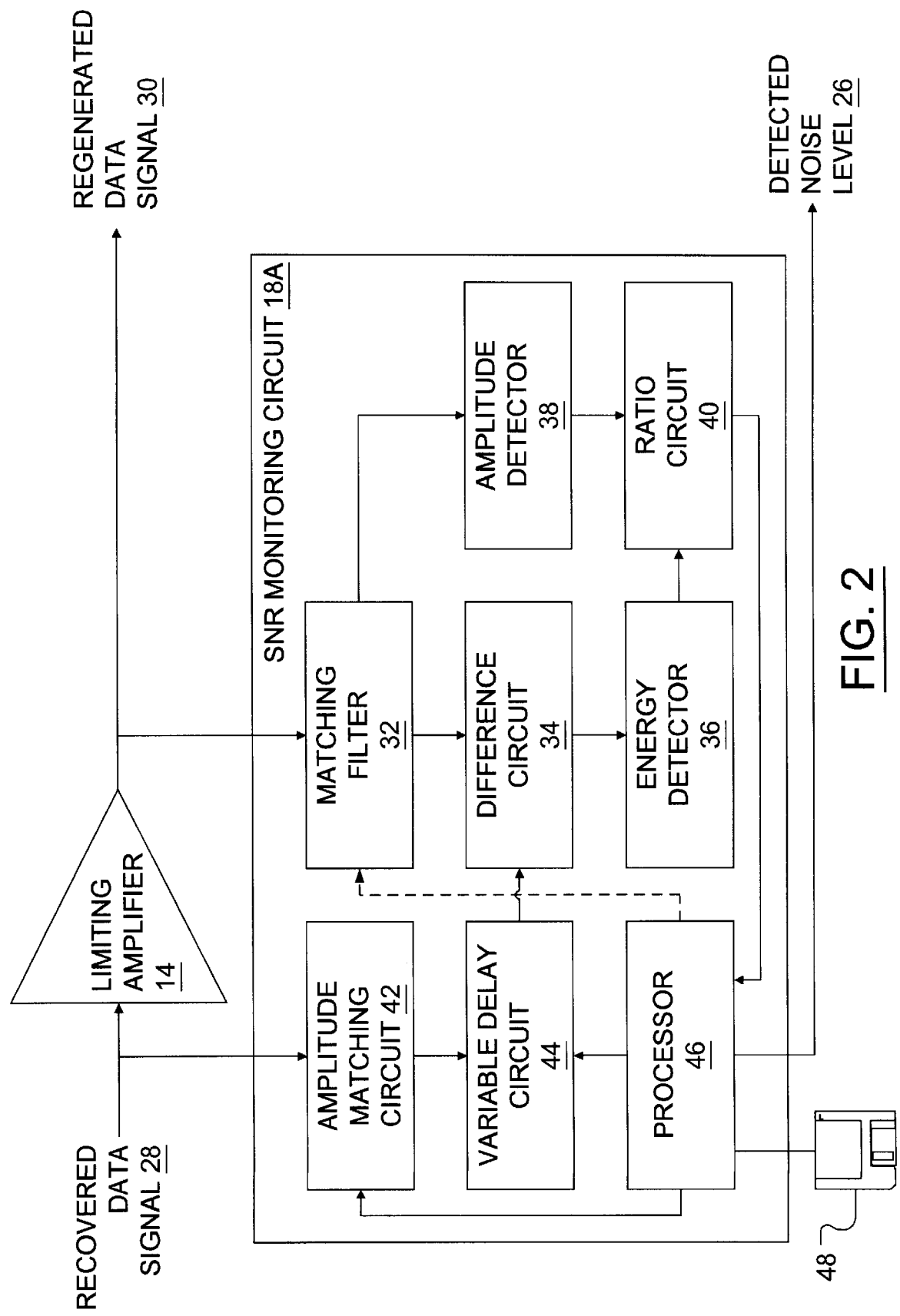
FIG. 2 illustrates, as a block diagram, the high level architecture of the SNR Monitor Circuit of FIG. 1 in accordance with a first embodiment of present invention.

In FIG. 2, as in subsequent FIGS., components like those in previous FIGS. have like reference numerals.

An arrangement of the high level architecture of SNR Monitoring Circuit 18A is illustrated in FIG. 2. SNR Monitoring Circuit 18A receives a (noisy) recovered data signal 28 from a point preceding the input of limiting amplifier 14 and a regenerated data signal 30 from a point subsequent to the output of limiting amplifier 14. Recovered data signal 28 is received by an amplitude matching circuit 42 whose output is passed to a variable delay circuit 44. Regenerated data signal 30 is received by a matching filter 32. A difference circuit 34 receives both the output of variable delay circuit 44 and the output of matching filter 32 and passes a signal representative of their difference to an energy detector 36. Output from an amplitude detector 38, which receives output from matching filter 32, is received at a ratio circuit 40 along with output from energy detector 36. Ratio circuit 40 generates a reported noise level and passes the reported noise level to a processor 46 which supplies input to vary amplitude matching circuit 42, variable delay circuit 44 and matching filter 32 according to a minimisation algorithm. Detected noise level 26 is provided, as output of SNR Monitoring Circuit 18A, by processor 46 once a determination has been made that the value has been sufficiently minimised. Processor 46 may be loaded with software for executing the minimisation algorithm in accordance with this invention from software medium 48 which could be a disk, a tape, a chip or a random access memory containing a file downloaded from a remote source. Alternatively, processor 46 may be any programmable logic such as a field programmable gate array (FPGA), a programmable logic device (PLD) or a fixed implementation such as an Application Specific Integrated Circuit (ASIC) or an analog circuit.

The difference between recovered data signal 28 and regenerated data signal 30 is determined through the noise suppression action of limiting amplifier 14. The purpose of limiting amplifier 14 is to detect the existence of a logical high or low. Limiting amplifier 14 is essentially a high gain amplifier configured such that the output is high or low depending on whether input amplitude exceeds a threshold. Since the output can essentially assume only one of two possible states, none of the amplitude noise superimposed upon the input signal remains. However., the input noise will nevertheless manifest itself as jitter or pulse width distortion. Clock and data recovery unit 16 (FIG. 1) recovers clean clock signal 24 (FIG. 1) from the data and retimes the data using that clock. The jitter problem may be alleviated by using clean clock signal 24 to time regenerated data signal 30. Alternatively, retimed data signal 22 may be used in place of regenerated data signal 30. a However, in the latter case an additional semi-fixed delay on the non-limited side of the monitor circuit is necessitated.

SNR Monitoring Circuit 18 (FIG. 1), in its simplest form, includes difference circuit 34, energy detector 36, amplitude detector 38 and ratio circuit 40.

Difference circuit 34 subtracts regenerated data signal 30 from recovered data signal 28. The output is the difference between the two signals. When the phase of recovered data signal 28 and regenerated data signal 30 exactly match, the output of difference circuit 34 consists mostly of the noise on recovered data signal 28.

Energy detector 36 circuit gives an output proportional to energy in the signal at its input. Preferably, the output from difference circuit 34, which is the input to energy detector 36, is the noise on the recovered data signal. The output of energy detector 36 may be proportional to the noise voltage (e.g., $V_{rms}$) or the noise power (e.g., $V^2_{rms}$). Preferably, the input bandwidth of energy detector 36 is less than the bit rate of the recovered data signal. The bandwidth may be as low as desired, provided that only noise over a small bandwidth is of interest. Alternatively, input filtering may be performed by a band pass filter if noise over a specific frequency range is desired. As well, a piece-wise spectral picture of the noise may be provided by several detectors with overlapping band pass ranges. Lastly, a spectrum analyser technique, whereby an effectively moving band pass filter is employed, can provide a continuous indication of the noise spectrum.

Amplitude detector 38 has an output proportional to the amplitude of the input signal. The choice of options for this circuit is large.

Ratio circuit 40 divides the output of amplitude detector 38 in peak volts by the noise energy in $V_{rms}$. If the output of energy detector is not in the appropriate units ($V_{rms}$) then ratio circuit 40 must translate (e.g. take square root of $V^2_{rms}$). Preferably, ratio circuit 40 is implemented in firmware, in which case each input voltage must be converted to a digital representation with an analog to digital converter (ADC).

Collectively, matching filter 32, amplitude matching circuit 42 and variable delay circuit 44 are employed such that the inputs to difference circuit 34 are equivalent in every way but for the differences introduced by noise.

Matching filter 32 is employed to make the regenerated data pulse match the shape of the expected recovered data pulse as modified by the transmission channel. Ideally the pulse shapes match exactly, so that, when recovered data signal 28 including noise is subtracted from regenerated data signal 30, the only remaining energy will be that of the noise on recovered data signal. Matching filter 32 may be removed from monitor 18A if the input bandwidth of energy detection circuit is sufficiently lower than the data rate.

Amplitude matching circuit 42 may be used to match the amplitudes of the recovered and regenerated data pulses. The gain of amplitude matching circuit 42, being variable, takes on a value from a predetermined range. The gain range may include values with magnitudes both greater than and less than one and signs both positive and negative as conditions require. Because the gain control is not a simple linear function, control may be better achieved through a digital controller such as processor 46. Note that a digital to analog converter (DAC) may be required between amplitude matching circuit 42 and processor 46. Known circuits that may be used as an amplitude matching circuit 42 include variable gain amplifiers and voltage controlled attenuators.

Variable delay circuit 44 is used to match the phase of the recovered and regenerated data pulses. As in the case of amplitude matching circuit 42, control of the variation in delay is preferably achieved through a digital controller. Again, a digital to analog converter (DAC) may be necessary. Known circuits suitable for use as a variable delay circuit 44 include voltage controlled phase modulators, equalisation circuits and digital delay circuits.

An adaptive minimisation algorithm performed by processor 46 may vary gain and phase in regular intervals (by controlling amplitude matching circuit 42 and by controlling variable delay circuit 44) and assess the detected noise level 26 after each interval. From these assessments, the settings which minimise noise level 26 are estimated. These settings provide an estimation for best payload cancellation. Payload is a term used to refer to the data portion of a signal as distinct from the noise portion. Preferably, due to the sophistication required, adaptive minimisation is implemented in firmware but may be implemented in hardware. In some cases adaptive minimisation may be unnecessary, rather a fixed and calibrated delay or gain setting may suffice. Since there is a degree of error in each assessment, it is necessary to take a number of assessments and from these estimate the settings of phase and amplitude that result in the best cancellation.

As should be apparent, the variations applied to the gain and delay of recovered data signal 28 within SNR Monitoring Circuit 18A in no way affect regenerated data signal 30 passed to clock and data recovery circuit 16 but, instead, allow for an accurate measure of SNR.

The detected noise level 26 at the output of SNR Monitoring Circuit 18A may be compared to a threshold to indicate whether the SNR has fallen below acceptable limits. Several threshold detectors (not shown) may be employed to detect and indicate varying degrees of quality.

Matching filter 32 may be adaptive and under the control of processor 46 such that the transfer response is adjustable by a minimisation algorithm. This may be necessary to accommodate varying transmission characteristics of the optical path as well as to accommodate distortions introduced by SNR Monitoring Circuit 18A.

Figure 3:
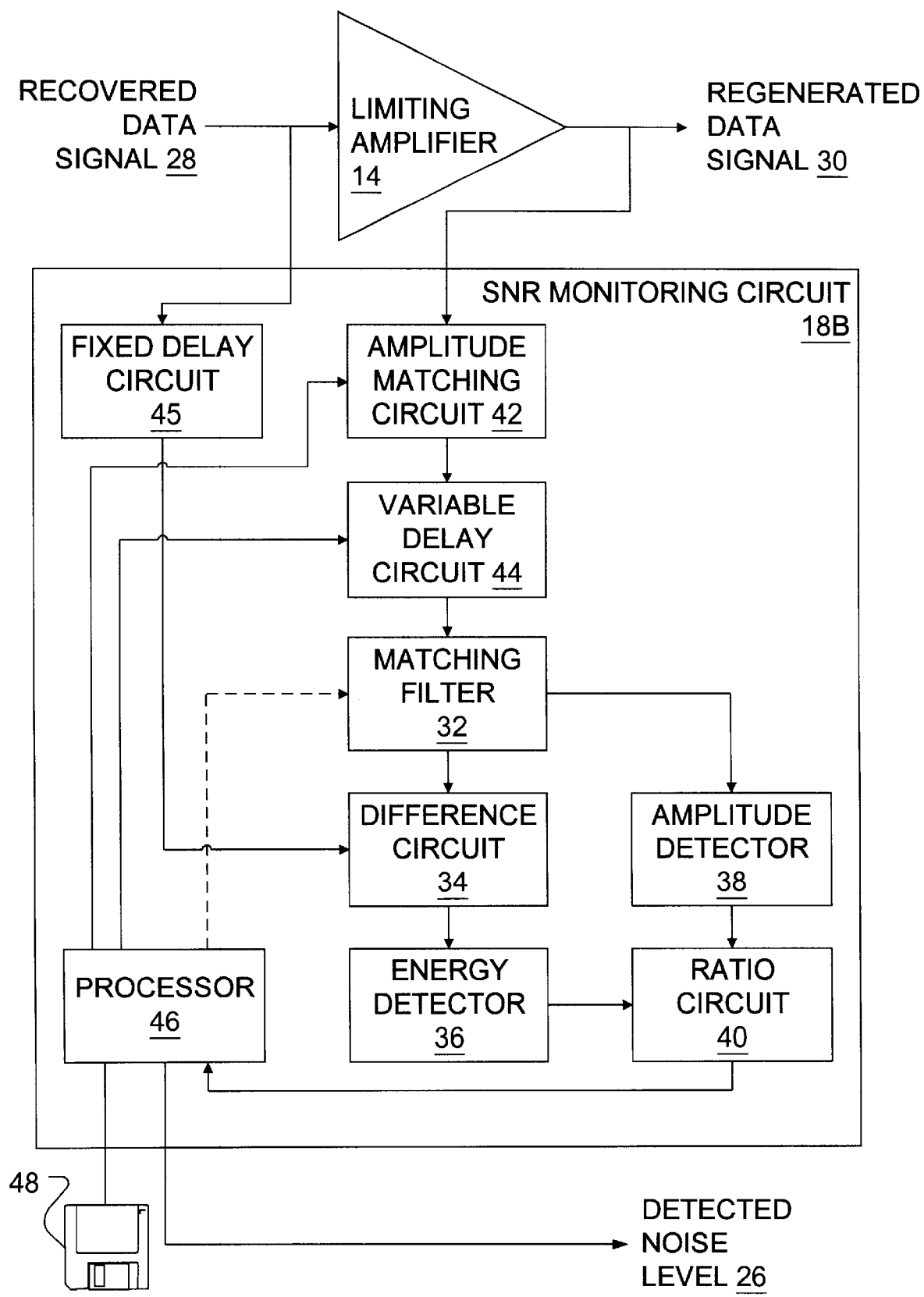
FIG. 3 illustrates, as a block diagram, the high level architecture of the SNR Monitor Circuit of FIG. 1 in accordance with a second embodiment of present invention.

An alternative arrangement of the high level architecture of SNR Monitoring Circuit 18 is illustrated in FIG. 3. SNR Monitoring Circuit 18B receives recovered data signal 28 at the input of limiting amplifier 14 and regenerated data signal 30 at the output of limiting amplifier 14. Regenerated data signal 30 is received by amplitude matching circuit 42 and passed to variable delay circuit 44, the output of which is passed to matching filter 32. A fixed delay circuit 45 delays recovered data signal 28. Fixed delay circuit 45 is required to cancel out the fixed delay of all elements between the input to limiting amplifier 14 and the input to difference circuit 34 including the minimum delay of variable delay circuit 44. Difference circuit 34 receives output from fixed delay circuit 45 and the output of matching filter 32 and passes a difference signal to energy detector 36. Output from amplitude detector 38, which has received output from matching filter 32, is received at ratio circuit 40 along with output from energy detector 36. Ratio circuit 40 generates output for SNR Monitoring Circuit 18B as a reported noise level. The reported noise level is fed to processor 46 which supplies input to vary amplitude matching circuit 42, variable delay circuit 44 and matching filter 32. Processor 46 may be loaded with software for executing a minimisation algorithm in accordance with this invention from software medium 48.

The SNR Monitoring Circuit 18B of FIG. 3 operates identically to that of FIG. 2. It will be appreciated by those skilled in the art that each of amplitude matching circuit 42 and variable delay circuit 44 may serve their respective purposes on either the recovered data signal side of monitor 18 (FIG. 1), as illustrated in monitor 18A (FIG. 2), or on the regenerated data signal side of monitor 18, as illustrated in monitor 18B (FIG. 3). Alternatively, one circuit may be on each side of the monitor. In the case where variable delay circuit 44 is on the regenerated data signal side as illustrated in monitor 18B, a fixed delay circuit 45 is required on the recovered data signal side of monitor 18B. Fixed delay circuit 45 compensates for the delay of the components on the regenerated data signal side of monitor 18B. Clearly, matching filter 32, amplitude matching circuit 42 and variable delay circuit 44 in the configuration illustrated in FIG. 3 may be combined into a single digital signal processing unit.

Figure 4:
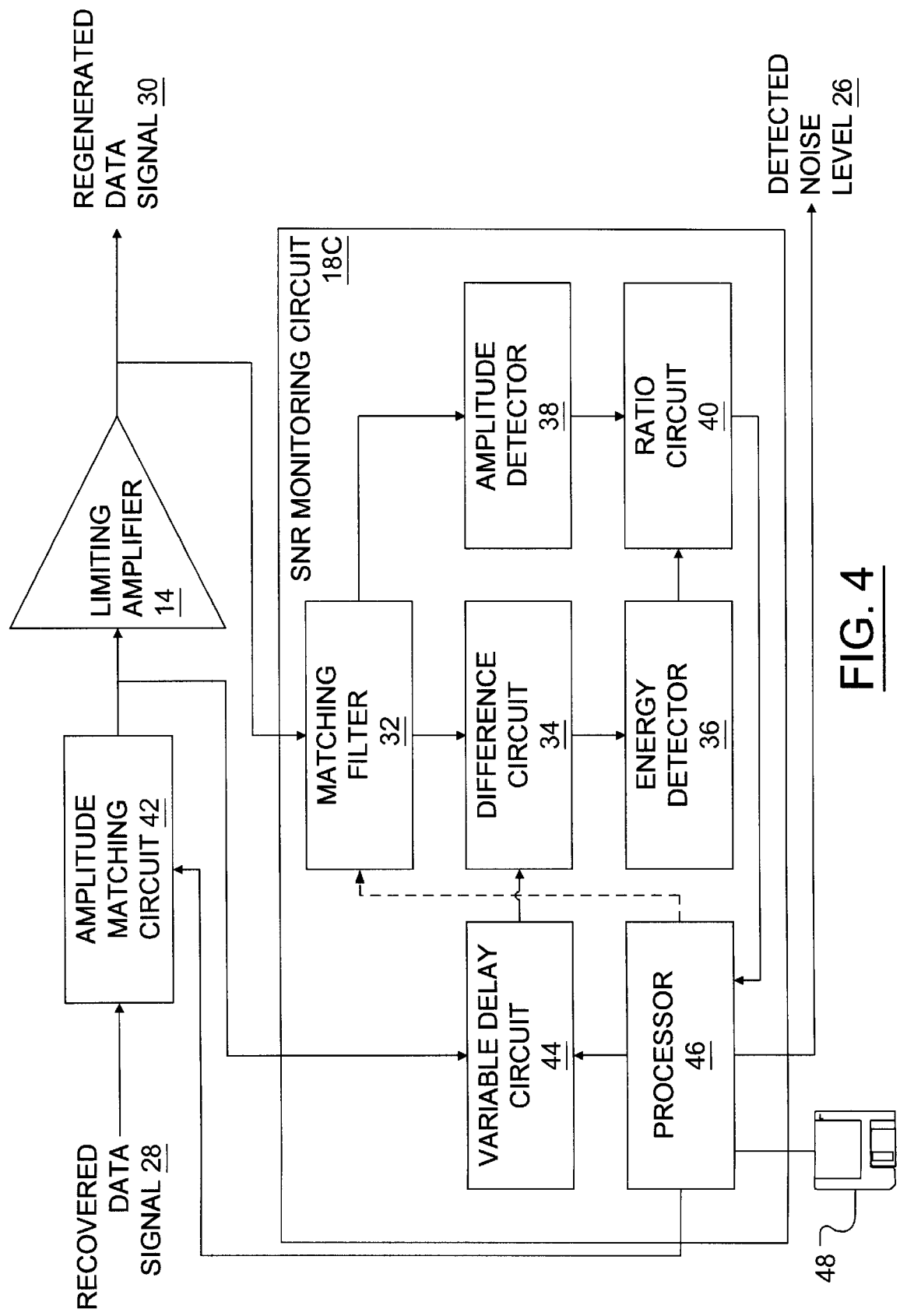
FIG. 4 illustrates, as a block diagram, the high level architecture of the SNR Monitor Circuit of FIG. 1 in accordance with a third embodiment of present invention.

As illustrated in FIG. 4, receiver 10 (FIG. 1) may include amplitude matching circuit 42 preceding limiting amplifier 14. In this configuration, the amplitude of recovered data signal 28 is adjusted under the control of processor 46, as part of SNR Monitoring Circuit 18C, according to a minimisation algorithm in accordance with this invention.

Thus, amplitude matching circuit 42 may be removed from monitor 18 and instead used in receiver 10 between photo detector and preamplifier 12 (FIG. 1) and limiting amplifier 14. Amplitude matching circuit 42 may then be used to adjust the amplitude of the recovered data signal 28 under control of a minimisation algorithm implemented by processor 46.

Figure 5:
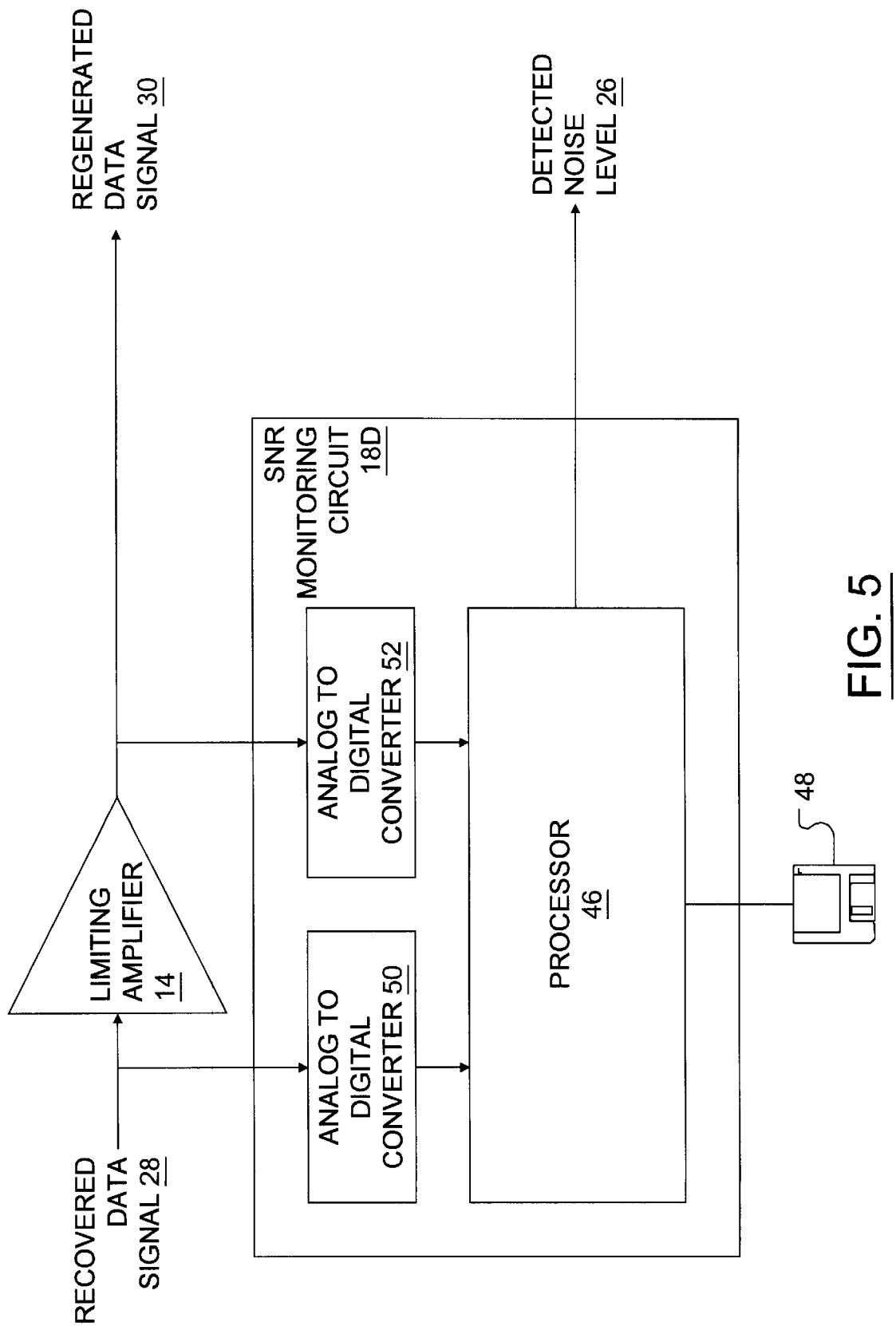
FIG. 5 illustrates, as a block diagram, the high level architecture of the SNR Monitor Circuit of FIG. 1 in accordance with a fourth embodiment of present invention.

FIG. 5 presents an alternative SNR Monitoring Circuit 18D in which analog to digital converters 50 and 52 are input with recovered data signal 28 and regenerated data signal 30 respectively. Processor 46 receives the digitised signals as input and outputs detected noise level 26. Processor 46 may be loaded with software for executing a minimisation algorithm in accordance with this invention from software medium 48.

It will be apparent to a person skilled in the art that any one of a number of adaptive minimisation algorithms may be employed. Two suitable methods are as follows. In a first method, known as a "dithering" method, consecutive samples differ slightly from an estimate and the output of an integrator provides a new estimate which converges on a minimum. In a second method, several samples are taken and curve fitting is used to determine a minimum.

Figure 6:
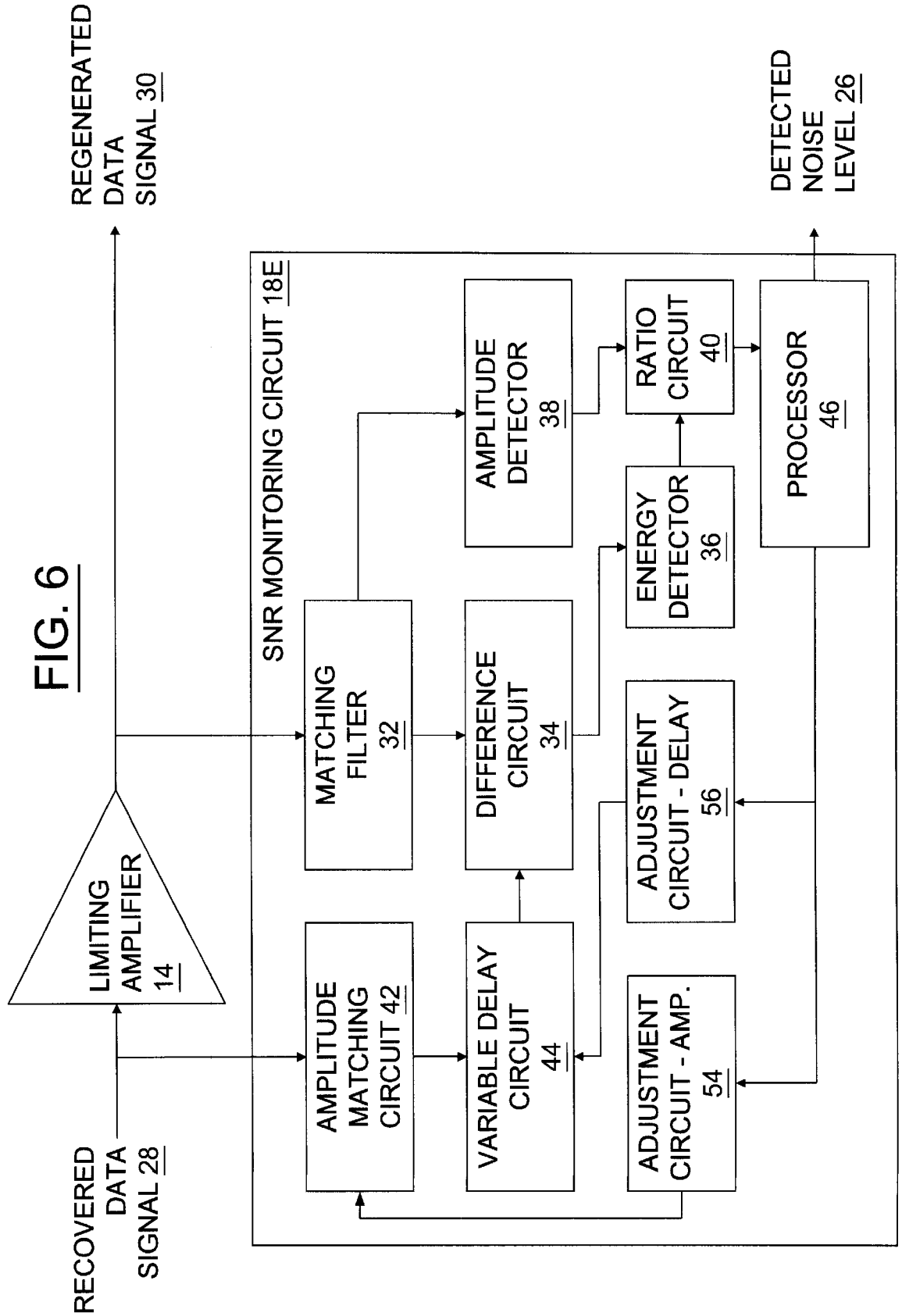
FIG. 6 illustrates, as a block diagram, the high level architecture of the SNR Monitor Circuit of FIG. 1 in accordance with a fifth embodiment of present invention.
Figure 7:
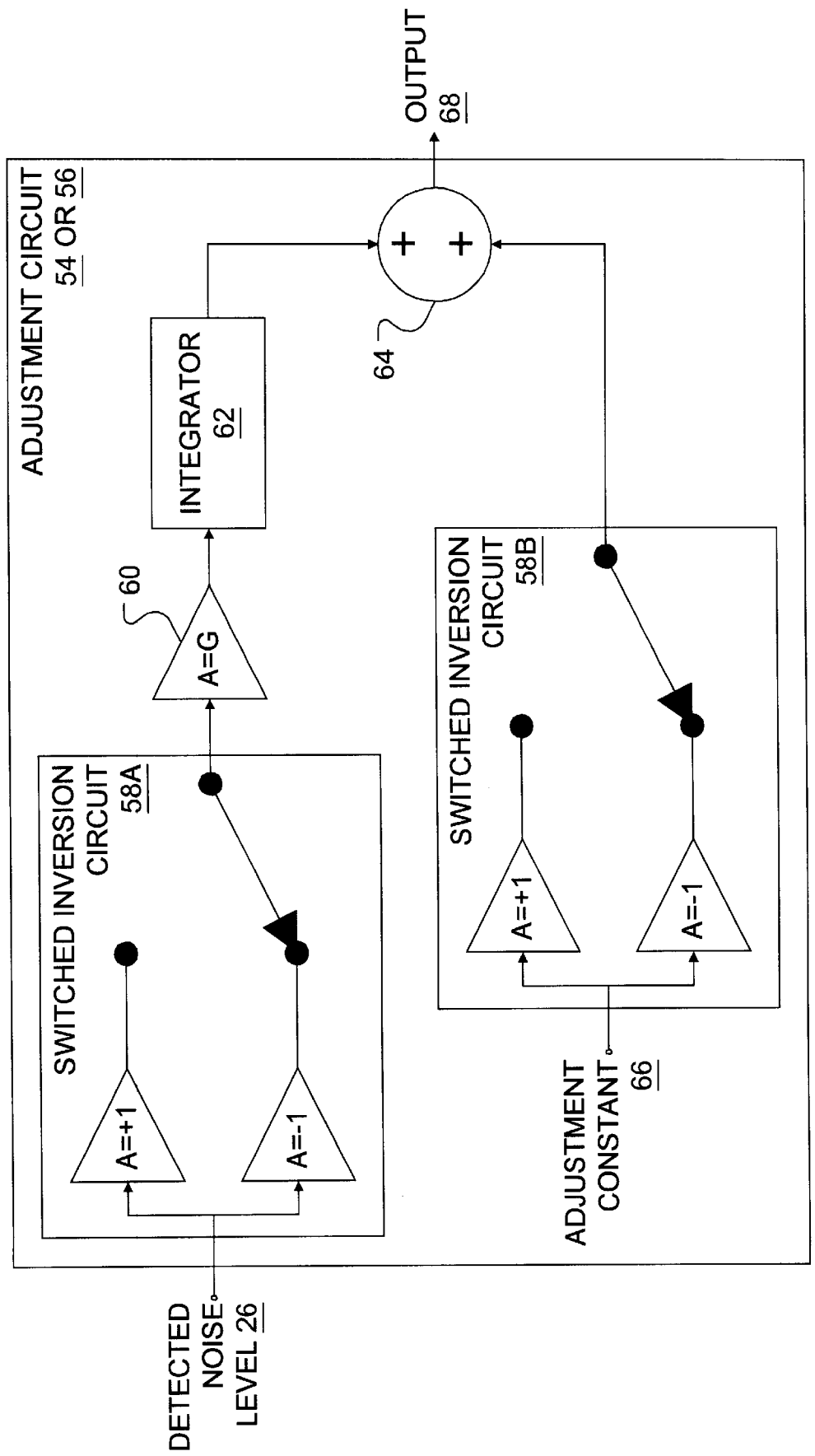
FIG. 7 illustrates an adjustment circuit useful in the SNR Monitor Circuit of FIG. 6 in accordance with an embodiment of present invention.

The first method (dithering) may be implemented in hardware by the monitor 18E of FIG. 6 in conjunction with adjustment circuits 54 and 56 as illustrated in FIG. 7. However, a minimisation approach employing processor 46 is preferred over a hardware approach.

SNR Monitoring Circuit 18E, illustrated in FIG. 6, is similar to SNR Monitoring Circuit 18A of FIG. 2 but includes separate amplitude and delay adjustment circuits, namely, amplitude adjustment circuit 54 and delay adjustment circuit 56 to perform the adaptive minimisation function of processor 46 (FIG. 2). From processor 46, the adjustment circuits 54 and 56 receive input as detected noise level 26. Output from amplitude adjustment circuit 54 is received by amplitude matching circuit 42 while output from delay adjustment circuit 56 is received by variable delay circuit 44.

Illustrated in FIG. 7 is an adjustment circuit which is equally useful as either amplitude adjustment circuit 54 or delay adjustment circuit 56 of FIG. 6. Detected noise level 26 is received by a switched inversion circuit 58A and passed to a loop amplifier 60 which passes the amplified signal to an integrator 62. The output of integrator 62, an estimate of the minimum of the value being sought, either phase or magnitude, is added, at an adder 64, to adjustment constant 66 output from a switched inversion circuit 58B.

As noted, the circuit of FIG. 7 is useful either as amplitude adjustment circuit 54 or delay adjustment circuit 56. In operation as amplitude adjustment circuit 54, detected noise level 26 is received as an input and an output 68 is an amplitude adjustment, offset slightly by an adjustment constant 66. Ultimately, an amplitude adjustment which results in a minimum detected noise level 26 is converged upon.

More particularly, detected noise level 26 is received by switched inversion circuit 58A and, depending on the state of the switch, the signal at the output of switched inversion circuit 58A is detected noise level 26 either unchanged or inverted. Loop amplifier 60 amplifies the signal at the output of switched inversion circuit 58A with a loop gain constant G and passes the amplified signal to integrator 62. The output of integrator 62 is an estimate of the minimum of the value being sought, either phase or magnitude. This estimate is added, at adder 64, to adjustment constant 66 whose sign is a function of the state of the switch in a switched inversion circuit 58B that switches states in synchrony with the switch of switched inversion circuit 58A. The switching rate of the switches in switched inversion circuit 58A and 58B is a set parameter of the circuit.

By way of example, consider the adjustment circuit of FIG. 7 as delay adjustment circuit 56 (FIG. 6). If, at a particular time t, an increase in delay results in a decrease in noise, then a positive sample x taken time t by switched inversion circuit 58A will have a greater magnitude than a negative sample y taken after switching states at time t+1. The overall effect of the magnitude of the first sample x being greater than the subsequent sample y is an increasing trend at the output of integrator 62 and an increasing trend of output 68. An increase in output 68 increases the delay and the noise is further reduced. Should delay adjustment circuit 56 overshoot a minimum noise setting, the magnitude of the first sample x will be lesser than the subsequent sample y and the output 68 will tend to decrease, thus decreasing the delay adjustment toward a minimum.

Primarily, the differences between amplitude adjustment circuit 54 and delay adjustment circuit 56 are loop gain constant G, adjustment constant 66 and the switching rate of switched inversion circuits 58A and 58B. Preferably, delay adjustment circuit 56 has a faster switching rate and convergence rate (set by G).

The second minimisation method is a windowed approach, whereby several samples of detected noise level 26 are taken over an array of magnitude and phase values. The location and the value minimum are estimated using curve fitting. The centre of the array is adjusted to tend towards the location of the estimated minimum. The value of the minimum is the noise energy. This method has an advantage over the first method in that it better tolerates local minima to which the first method may converge. A second advantage of this method is the use of several measurement points to estimate a minimum, thus potentially reducing effects of residual noise. Although this method may be implemented in hardware, the complexity involved in such an implementation leads to a preference for a software based implementation.

Either algorithm will have an associated fixed error. This error might be analytically derived, but it will likely vary with implementation. The value of the fixed error may be found through calibration. A more exact SNR value may then be derived by applying a correction algorithm using the calibration data.

Other modifications will be apparent to those skilled in the art and, therefor, the invention is defined in the claims.

I claim:

1. A method of determining an indicator of signal to noise ratio in a noisy data signal comprising:

receiving said noisy data signal;

limiting said noisy data signal to obtain a regenerated data signal;

generating a noise signal by subtracting said regenerated data signal from said noisy data signal;

determining a magnitude of energy of said noise signal;

determining an amplitude of said regenerated data signal; and determining said indicator from said amplitude of said regenerated data signal and said magnitude of energy of said noise signal.

2. The method of claim 1 further comprising filtering said regenerated data signal so that a pulse shape of said regenerated data signal approximates a pulse shape of said noisy data signal.

3. The method of claim 2 further comprising adjusting said regenerated data signal filtering based on said indicator.

4. The method of claim 3 wherein said filtering adjusting optimizes said indicator.

5. The method of claim 1 further comprising amplifying said noisy data signal so that an amplitude of said noisy data signal approximates an amplitude of said regenerated data signal.

6. The method of claim 5 further comprising adjusting a gain of said amplifying based on said indicator.

7. The method of claim 6 wherein said gain adjusting optimizes said indicator.

8. The method of claim 1 further comprising delaying said noisy data signal so that a phase of said noisy data signal approximates a phase of said regenerated data signal.

9. The method of claim 8 further comprising adjusting said delaying based on said indicator.

10. The method of claim 9 wherein said delay adjusting optimizes said indicator.

11. The method of claim 1 further comprising amplifying said regenerated data signal so that an amplitude of said regenerated data signal approximates an amplitude of said noisy data signal.

12. The method of claim 11 further comprising adjusting a gain of said amplifying based on said indicator.

13. The method of claim 12 wherein said gain adjusting optimizes said indicator.

14. The method of claim 1 further comprising delaying said regenerated data signal so that a phase of said regenerated data signal approximates a phase of said noisy data signal.

15. The method of claim 14 further comprising adjusting said delaying based on said indicator.

16. The method of claim 15 wherein said delay adjusting optimizes said indicator.

17. The method of claim 1 wherein said indicator determining comprises dividing said amplitude of said regenerated data signal by said magnitude of energy of said noise signal.

18. The method of claim 1 wherein said magnitude of energy of said noise signal is proportional to the root mean square voltage of said noise signal.

19. The method of claim 1 wherein said magnitude of energy of said noise signal is proportional to the root mean square power of said noise signal.

20. A monitor for determining an indicator of a signal to noise ratio of a noisy data signal, based on input comprising said noisy data signal and a regenerated data signal, said monitor comprising:
- a difference circuit for determining a noise signal comprising a difference between said noisy data signal and said regenerated data signal;
- an energy detector for determining a magnitude of energy of a signal output from said difference circuit;
- an amplitude detector for determining an amplitude of said regenerated data signal; and
- a ratio circuit for determining an indicator from output of said energy detector and output of said amplitude detector.

21. The monitor of claim 20 further comprising a filter for filtering said regenerated data signal so that a pulse shape of said regenerated data signal approximates a pulse shape of said noisy data signal.

22. The monitor of claim 21 wherein said filter has a variable characteristic.

23. The monitor of claim 22 wherein said monitor further comprises a processor for varying said characteristic to optimize said indicator.

24. The monitor of claim 20 further comprising all amplifier for amplifying said noisy data signal so that an amplitude of said noisy data signal approximates an amplitude of said regenerated data signal.

25. The monitor of claim 24 wherein said amplifier has a variable gain.

26. The monitor of claim 25 wherein said monitor further comprises a processor for varying said gain to optimize said indicator.

27. The monitor of claim 25 wherein said monitor further comprises an adjustment circuit for varying said gain to optimize said indicator.

28. The monitor of claim 26 further comprising a delay circuit for delaying said noisy data signal so that a phase of said noisy data signal approximates the phase of said regenerated data signal.

29. The monitor of claim 28 wherein said delay circuit has a variable delay.

30. The monitor of claim 29 wherein said monitor further comprises a processor for varying said delay to optimize said indicator.

31. The monitor of claim 29 wherein said monitor further comprises an adjustment circuit for varying said delay to optimize said indicator.

32. The monitor of claim 20 further comprising an amplifier for amplifying said regenerated data signal so that an amplitude of said regenerated data signal approximates an amplitude of said noisy data signal.

33. The monitor of claim 32 wherein said amplifier has a variable gain.

34. The monitor of claim 33 wherein said monitor further comprises a processor for varying said gain to optimize said indicator.

35. The monitor of claim 33 wherein said monitor further comprises an adjustment circuit for varying said gain to optimize said indicator.

36. The monitor of claim 20 further comprising a delay circuit for delaying said regenerated data signal so that a phase of said regenerated data signal approximates a phase of said noisy data signal.

37. The monitor of claim 36 wherein said delay circuit has a variable delay.

38. The monitor of claim 37 wherein said monitor further comprises a processor for varying said delay to optimize said indicator.

39. The monitor of claim 37 wherein said monitor further comprises an adjustment circuit for varying said delay to optimize said indicator.

40. The monitor of claim 20 wherein the bandwidth of said energy detector is less than the bit rate of said noisy data signal.

41. A monitor for determining an indicator of a signal to noise ratio of a noisy data signal, based on input comprising said noisy data signal and a regenerated data signal, said monitor comprising:
- means for determining a noise signal comprising a difference between said noisy data signal and said regenerated data signal;
- means for determining a magnitude of energy of a signal output from said difference circuit;
- means for determining an amplitude of said regenerated data signal; and
- means for determining an indicator from output of said difference signal energy determining means and said regenerated signal amplitude determining means.

42. A monitor for determining an indicator of a signal to noise ratio of a noisy data signal, based on input comprising said noisy data signal and a regenerated data signal, said monitor comprising:
- a first conversion means for converting said noisy data signal from analog to digital;
- a second conversion means for converting said regenerated data signal from analog to digital;
- a processor operable to:
  - receive a digital representation of said noisy data signal from said first conversion means;
  - receive a digital representation of said regenerated data signal from said second conversion means;
  - generate a noise signal by subtracting said digital representation of said regenerated data signal from said digital representation of said noisy data signal;
  - determine a magnitude of energy of said noise signal;
  - determine an amplitude of said regenerated data signal; and
  - determine said indicator from said amplitude of said regenerated data signal and said magnitude of energy of said noise signal.

43. A receiver in an optical transmission system comprising:
- a photodetector and preamplifier for converting a received optical signal to a noisy data signal;

a limiting amplifier for limiting said noisy data signal to obtain a regenerated data signal;

a clock and data recovery circuit for obtaining a retimed data signal and a recovered clock signal from said regenerated data signal;

a signal to noise ratio monitoring circuit operable to:
  receive said noisy data signal;
  receive said regenerated data signal;
  generate a noise signal by subtracting said regenerated data signal from said noisy data signal;
  determine a magnitude of energy of said noise signal;
  determine an amplitude of said regenerated data signal; and
  determine an indicator of a signal to noise ratio of said noisy data signal from said amplitude of said regenerated data signal and said magnitude of energy of said noise signal.

* * * * *

UNITED STATES PATENT AND TRADEMARK OFFICE
CERTIFICATE OF CORRECTION

PATENT NO. : 6,480,315 B1 Page 1 of 1
DATED : November 12, 2002
INVENTOR(S) : Matthew Brown It is certified that error appears in the above-identified patent and that said Letters Patent is hereby corrected as shown below:

Column 9,
Line 44, "comprising all" should be changed to -- comprising an --;
Line 56, "The monitor of claim 26" should be changed to -- The monitor of claim 20 --;

Signed and Sealed this

Twenty-eighth Day of October, 2003

JAMES E. ROGAN
*Director of the United States Patent and Trademark Office*